United States Patent
Yokoyama et al.

(10) Patent No.: US 8,153,711 B1
(45) Date of Patent: Apr. 10, 2012

(54) POLYUREA SAG CONTROL AGENT IN POLYTRIMETHYLENE ETHER DIOL

(76) Inventors: Ayumu Yokoyama, Wallingford, PA (US); Rajesh Gopalan Saliya, Media, PA (US); Hari Babu Sunkara, Hockessin, DE (US)

( * ) Notice: Subject to any disclaimer, the term of this patent is extended or adjusted under 35 U.S.C. 154(b) by 0 days.

(21) Appl. No.: 13/039,354

(22) Filed: Mar. 3, 2011

(51) Int. Cl.
*C08L 75/02* (2006.01)
*C08G 18/48* (2006.01)

(52) U.S. Cl. ........................................ 524/196; 524/589
(58) Field of Classification Search .................. 524/196, 524/589
See application file for complete search history.

(56) References Cited

U.S. PATENT DOCUMENTS

| | | | |
|---|---|---|---|
| 4,677,028 A * | 6/1987 | Heeringa et al. | 428/422.8 |
| 5,633,362 A | 5/1997 | Nagarajan et al. | |
| 5,686,276 A | 11/1997 | Laffend et al. | |
| 5,821,092 A | 10/1998 | Nagarajan et al. | |
| 6,221,494 B1 | 4/2001 | Barsotti et al. | |
| 6,875,514 B2 | 4/2005 | Sormani et al. | |
| 7,910,644 B2 * | 3/2011 | Saliya et al. | 524/196 |
| 2008/0160289 A1 | 7/2008 | Lin | |
| 2010/0004365 A1 * | 1/2010 | Saliya et al. | 524/197 |

FOREIGN PATENT DOCUMENTS

WO   WO 2011/037818   *   3/2011

OTHER PUBLICATIONS

J. Polymer Sci., Polymer Chemistry Ed. 28, 449 to 444 (1985).

* cited by examiner

*Primary Examiner* — Milton I Cano
*Assistant Examiner* — John Uselding
(74) *Attorney, Agent, or Firm* — Brian J Myers

(57) ABSTRACT

The present disclosure relates to a sag control composition consisting essentially of the reaction product of an amine and a polyisocyanate and polytrimethylene ether diol. The sag control composition can be used for providing further compositions that have excellent sag resistance, especially on vertical surfaces. The sag control composition can also provide compositions having a relatively lower content of organic solvent when compared to previously known sag control compositions.

6 Claims, No Drawings

POLYUREA SAG CONTROL AGENT IN POLYTRIMETHYLENE ETHER DIOL

FIELD OF THE DISCLOSURE

The present disclosure is directed to a composition that is useful as a sag control agent, especially in the area of coating compositions. The sag control agent consists essentially of the reaction product of a polyisocyanate and an amine and polytrimethylene ether diol. Coating compositions comprising the sag control agent can provide coatings being sag-free at high coating thicknesses, having excellent adhesion to substrates, and good appearance. The present disclosure also provides processes for forming the sag control agent and for coating compositions comprising the sag control agent.

BACKGROUND OF DISCLOSURE

A typical coating finish over a substrate comprises some or all of the following layers: (1) one or more primer layers that provide adhesion and basic protection, and also cover minor surface unevenness of the substrate; (2) one or more basecoat layers, typically pigmented, that provide durability and color; and (3) one or more clearcoat layers that provide additional durability and improved appearance. A colored topcoat layer can be used in place of the basecoat layer and clearcoat layer.

In some industrial applications, such as coating metal pipes, trucks, and other industrial equipment, it is often desired to complete the coating process in a short period of time while still achieving good adhesion, protection, durability and appearance. Conventional coating compositions for colored layers are often less optimized for good adhesion directly to metals. In addition, a conventional coating composition typically produces a thin dried and cured coating layer that may not have sufficient thickness to cover unevenness of the substrate if only a single layer is used. Coating unevenness could result in undesired appearance. When conventional coatings are applied at a high coating thickness, surface coating defects such as microfoaming, low gloss, and sagging may occur. Thick coating layers can be prone to sagging defects, especially for coating layers applied on vertical surfaces.

Because of the known sagging problems when applying coatings, sag control agents are often added to form a smooth sag-free surface. Typical sag control agents are produced reacting a compound containing one or more amine groups with a compound containing one or more isocyanate groups, generally in the presence of a film forming binder, such as, for example, an acrylic resin. Because film forming resins are viscous in nature, the resins generally contain an organic solvent to lower the viscosity to a level that is suitable for the formation of the sag control agent. This adds additional volatile organic content (VOC) to the sag control composition and ultimately to the coating composition.

Therefore, there is a need for sag control agents and sag control compositions that can provide low VOC coating compositions that are sag-free at high coating thicknesses, having good direct-to-metal adhesion, and good appearance.

STATEMENT OF THE DISCLOSURE

Disclosed is a composition consisting essentially of:
A) polytrimethylene ether diol; and
B) a polyurea sag control agent consisting essentially of the reaction product of an amine and a polyisocyanate.

Also disclosed is a process for forming the polyurea sag control agent described above.

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including every value between the minimum and maximum values.

As used herein:

The term "sag" or "sagging" refers to coating defects such as dropping line, sagging curtains, tearing drops, or other defects and variations in coating that cause the coating to be un-smooth. The term "sag-free" or "free of sagging" or "free of sag" means a coating that is free of sagging defects. It is known to those skilled in the art that a thick wet coating layer tends to form sagging defects.

The term "(meth)acrylate" means methacrylate or acrylate.

The term "solids content" refers to the total weight percentage of nonvolatile components in the coating composition. Stated another way, the solids content is the weight percentage of the components that remain after all of the volatile organic solvents have been removed from the composition.

The term "renewable content" refers to the weight percentage of the total composition that is derived from renewable resources. In some embodiments, a particular composition can have in the range of from 1 percent to 100 percent of the composition. In other embodiments, the renewable content can be in the range of from 10 percent to 90 percent. In still further embodiments, the renewable content can be in the range of from 15 percent to 85 percent. In some embodiments, the renewable content is from the use of polytrimethylene ether dial in the sag control composition. In other embodiments, a coating composition comprising the disclosed sag control composition can have renewable content from the use of film forming binders derived from renewable resources, such as, for example, alkyd resins, polytrimethylene ether diols, polyesters or other film forming binders known in the art to be derived from renewable resources.

The use of polytrimethylene ether diols in coating compositions is known in the art. Typically, the polytrimethylene ether diol is added directly to the coating composition. When solid polytrimethylene ether diols are used, it can be necessary to either heat the coating composition in order to fully dissolve the polymer or to first dissolve the polytrimethylene ether dials in an organic solvent prior to adding it to the coating composition. The present disclosure provides a method of adding polytrimethylene ether diol to a coating composition that does not need to be heated or have additional organic solvents added to it.

The present disclosure relates to a composition consisting essentially of A) a polyurea sag control agent and B) polytrimethylene ether diol. In other embodiments, the composition consists essentially of A) a polyurea sag control agent; B) polytrimethylene ether diol; and C) one or more organic solvents. The term polytrimethylene ether diol means a polyether dial that has one or more repeat units derived from 1,3-propanediol.

Suitable organic solvents that can be used in addition to the polytrimethylene ether dial can include any of the organic solvents that are typically used for solventborne coating compositions. Specific examples can include, but are not limited to, aromatic hydrocarbons, such as, toluene, xylene and 4-chlorobenzotrifluoride; ketones, such as, acetone, methyl ethyl ketone, methyl isobutyl ketone, methyl amyl ketone and diisobutyl ketone; esters, such as, ethyl acetate, n-butyl acetate, tert-butyl acetate, isobutyl acetate; ethers, such as, ethylene glycol dimethyl ether, ethylene glycol dibutyl ether; and a combination thereof. In some embodiments, the organic solvent can be a volatile organic content (VOC) exempt solvent such as, for example, t-butyl acetate, methyl acetate, acetone, 4-chlorobenzotrifluoride or a combination thereof.

The present disclosure also provides a process to form the polyurea sag control agent. In some embodiments, the process to form the polyurea sag control agent can comprise or consist essentially of the steps of;
1) providing a mixture of an amine in polytrimethylene ether diol; and
2) adding a polyisocyanate to the mixture.

In other embodiments, the process to form the composition consisting essentially of the polyurea sag control agent can comprise or consist essentially of the steps of;
1) providing a mixture of an amine in a mixture polytrimethylene ether diol and one or more organic solvents; and
2) adding a polyisocyanate to the mixture.

The addition of the polyisocyanate can be done all at once or over a defined time period in the range of from 1 minute to several hours. In some embodiments, the molar amount of amine is in excess compared to that of the molar amount of isocyanate groups of the polyisocyanate. The molar excess of amine can be in the range of from less than 1 percent to 20 percent. In other embodiments, the molar excess of amines can be up to about 10 percent.

Suitable polyisocyanates that can be used for the formation of the polyurea sag control agent can include blocked or un-blocked aliphatic, cycloaliphatic, heterocyclic, aromatic di-, tri-, polyisocyanates or a combination thereof. Examples of suitable polyisocyanates can include 1,6-hexamethylene diisocyanate, 2,2,4-trimethylhexane-1,6-diisocyanate, 2,4,4-trimethylhexane-1,6-diisocyanate, cyclohexyl-1,4-diisocyanate, isophorone diisocyanate, the adduct of 1 molecule of 1,4-butanediol and 2 molecules of isophorone diisocyanate, the adduct of 1 molecule of 1,4-butanediol and 2 molecules of hexamethylene diisocyanate, dicyclohexylmethane-4,4'-diisocyanate, xylene diisocyanate, 1,3,5-trimethyl-2,4-bis(isocyanatomethyl)benzene, toluene diisocyanate, diphenylmethane-4,4'-diisocyanate, adducts of hexamethylene diisocyanate, adducts of isophorone diisocyanate, and adducts of toluene diisocyanate. Isocyanurate-trimers of diisocyanates can also be suitable. Combinations of the polyisocyanates can also be suitable. Any of the polyisocyanates mentioned in the examples above can be blocked or unblocked. In some embodiments, the polyisocyanate is 1,6-hexamethylene diisocyanate.

Suitable amines can include, for example, primary amines having in the range of from 1 to 20 carbon atoms. In some embodiments, secondary amines can be used, however, the use of secondary amines should be carefully considered because the rate of reaction of the polyisocyanate with a secondary amine is slower when compared to that of a primary amine. When secondary amines are used, it can be possible that the polyisocyanate reacts with one or more of the hydroxyl groups of the polytrimethylene ether diol. Reactions of the polyisocyanate with the polytrimethylene ether diol should be minimized. In some embodiments, diamines can also be used. With the use of diamines, one must be aware that the use of polyisocyanates and diamines could result in long chain high molecular weight polyureas which is not preferred.

Examples of primary amines can include benzyl amine, ethylamine, 1-propylamine, n-propylamine, 1-butylamine, 2-butylamine, t-butylamine, n-pentylamine, 2-methyl-1-butylamine, 1-hexylamine, 2-hexylamine, 3-hexylamine, octylamine, decylamine, laurylamine, stearylamine, cyclohexylamine, and aniline. Other amines that can be suitable include alkyl ether amines, such as, for example, 2-aminoethanol alkyl ether, 3-aminopropanol alkyl ether and 2-aminopropanol alkyl ether. Examples of secondary amines can include, for example, the N-alkyl derivatives of any of the primary amines listed above wherein alkyl means an alkyl radical having in the range of from 1 to 10 carbon atoms. Examples of diamines can include, aliphatic and cycloaliphatic diamines such as, for example, ethylene diamine, 1,2-propylenediamine, 1,3-diaminopropane, 1,4-butanediamine, neopentanediamine, 4,4-diaminodicyclohexylmethane, isophoronediamine, hexamethylenediamine, 1,12-dodecanediamine, piperazine, polyether diamines, polytrimethylene ether diamine or a combination thereof. In some embodiments, combinations of any of the above listed amines can also be suitable. In still further embodiments, the amine is free from or essentially free from fluorinated amines. In one embodiment, the amine is benzyl amine. As used herein, "essentially free from fluorinated amines" means that the component contains less than 1 percent by weight of an amine containing one or more fluorine atom.

The polytrimethylene ether diol of the present disclosure can have a number average molecular weight (Mn) in the range of from 250 to 10,000, preferably 250 to 8,000, and more preferably 300 to 4,000. The polytrimethylene ether diol can have a Tg of about −75° C., a polydispersity in the range of from 1.1 to 2.1 and a hydroxyl number in the range of from 20 to 200. Suitable polytrimethylene ether dials can be purchased under the CERENOL® polyether brand name and available from DuPont, Wilmington, Del.

Suitable polytrimethylene ether diols can be prepared by an acid-catalyzed polycondensation of 1,3-propanediol, such as described in U.S. Pat. Nos. 6,977,291 and 6,720,459. The polytrimethylene ether diol can also be prepared by the ring opening polymerization of a cyclic ether, oxetane, such as described in J. Polymer Sci., Polymer Chemistry Ed. 28, 449 to 444 (1985). The polycondensation of 1,3-propanediol is preferred over the use of oxetane since the diol is a less hazardous, more stable, and a lower cost, commercially available material and can be prepared by use of petro chemical feed-stocks or renewable resources.

A bio-route via fermentation of a renewable resource can be used to obtain the 1,3-propanediol. One example of renewable resources is corn since it is readily available and has a high rate of conversion to 1,3-propanediol and can be genetically modified to improve yields to the 1,3-propanediol. Examples of typical bio-route can include those described in U.S. Pat. No. 5,686,276, U.S. Pat. No. 5,633,362 and U.S. Pat. No. 5,821,092.

Homopolymers or copolymers of polytrimethylene ether diol can be suitable for the composition of this disclosure. In some embodiments, the homopolymers and/or copolymers of the polytrimethylene ether diol can be polymerized from a monomer mixture having a 1,3-propanediol content in the range of from 50 to 100 percent by weight and in the range of from 0 percent to 50 percent by weight of other dials. In other embodiments, the copolymers of polytrimethylene ether diol can be polymerized from a monomer mixture having a 1,3-propanediol content in the range of from 60 percent to 99 percent by weight and in the range of from 1 percent to 40 percent by weight of one or more other diols. In still other embodiments, the copolymers of polytrimethylene ether diol can be polymerized from a monomer mixture having a 1,3-propanediol content in the range of from 70 percent to 99 percent by weight and in the range of from 1 percent to 30 percent by weight of other diols. As used herein, the percentages by weight are based on the entire weight of the monomer mixture. Examples of such suitable copolymers of polytrimethylene ether dial can be prepared by copolymerizing 1,3-propanediol with another diol, such as, ethane diol, hexane dial, 2-methyl-1,3-propanediol and 2,2-dimethyl-1,3-propanediol.

Blends of the polytrimethylene ether diol and other cycloaliphatic hydroxyl containing branched or linear oligomers can be used. Such hydroxyl containing oligomers are known to those skilled in the art. Examples of such hydroxyl containing oligomers can include those disclosed by Barsotti, et al. in U.S. Pat. No. 6,221,494.

Polyurea sag control agents produced via the disclosed method can be added directly to coating compositions and help to provide a layer of coating composition that can be applied at high thicknesses that do not sag or cause other known defects. Typically, the polyurea sag control compositions produced by the disclosed method can be added to a coating composition in a range of from 0.1 percent to 10 percent by weight of the polyurea sag control agent, based on the total weight of the binder. In another embodiment, 0.2 percent to 8 percent by weight of the polyurea sag control agent can be used and in the range of from 0.2 percent to 5 percent in yet another embodiment, wherein the weight percent are based on the total weight of the binder. If a commercial sag control composition, such as, for example, such as BYK® 410, available from BYK-Gardener, Columbia, Md., is used in conjunction with the disclosed polyurea sag control composition such as BYK® 410 is used, polarity of solvent or solvent mix may need to be adjusted according to manufacturer's instruction so the SCA can be dispersed into the coating without separation Suitable coating compositions contain film forming binders and are known in the art. The film forming binders can comprise, for example, acrylic, polyester, polyether, polyurethane polymers or combinations thereof. Typically, the polymers contain one or more functional groups that can crosslink with a crosslinking agent to form a crosslinked network that can provide excellent durability, adhesion and appearance to a layer of the cured coating composition. The crosslinking agents can include, for example, blocked or unblocked polyisocyanates; melamines or other amino resins; or other crosslinking agents known in the art. Combinations thereof can also be used.

In order to increase the amount of renewable content in the coating composition, at least a portion of the film forming binders can be derived from renewable resources. In some embodiments, alkyd resins, derived from renewable diacids can be used. In other embodiments, the film forming binder can contain one or more polytrimethylene ether polyols that have been derived from renewable resources. Other film forming binders that have been derived from renewable resources are known in the art and can be used.

Depending upon the type of crosslinking agent, the coating composition of this invention can be formulated as one-pack (1K) or two-pack (2K) coating composition. If polyisocyanates with free isocyanate groups are used as the crosslinking agent, the coating composition can be formulated as a two-pack coating composition wherein the crosslinking agent is mixed with other components of the coating composition only shortly before coating application. If blocked polyisocyanates are used as the crosslinking agent, the coating compositions can be formulated as a one-pack (1K) coating composition. The coating composition can be further adjusted to spray viscosity with organic solvents as determined by those skilled in the art before being applied.

In a typical two-pack coating composition comprising two packages, the two packages are mixed together shortly before application. The first package typically can contain the binder including the polymer having one or more hydroxyl crosslinkable functional groups and the polyurea sag control composition. Optionally, one or more pigments can be dispersed in the first package using conventional dispersing techniques, for example, ball milling, sand milling, and attritor grinding. The second package can contain the crosslinking agent, such as, a polyisocyanate crosslinking agent, and solvents.

The coating composition according to the disclosure can be suitable for vehicle and industrial coating and can be applied using known processes. In the context of vehicle coating, the coating composition can be used both for vehicle original equipment manufacturing (OEM) coating and for repairing or refinishing coatings of vehicles and vehicle parts. Curing of the coating composition can be accomplished at ambient temperatures, such as temperatures in a range of from 18° C. to 35° C., or at elevated temperatures, such as at temperatures in a range of from 35° C. to 150° C. Typical curing temperatures of 20° C. to 80° C., in particular of 20° C. to 60° C., can be used for vehicle repair or refinish coatings.

The coating composition comprising the sag control composition according to the disclosure can be applied by conventional techniques, such as, spraying, electrostatic spraying, dipping, brushing, and flow coating. In some embodiments, the coating can be applied to a substrate to form a sag-free coating layer having a wet coating thickness, also known as wet film thickness (wft), in a range of from 5 to 36 mils (about 127 to 914 micrometers), in other embodiments, the wet film thickness can be in the range of from 6 to 36 mils (about 152 to 914 micrometers), and in still further embodiments, in the range of from 7 to 36 mils (about 178 to 914 micrometers), in yet more embodiments, in the range of from 8 to 36 mils (about 203 to 914 micrometers), in the range of from 10 to 36 mils (about 254 to 914 micrometers), in the range of from 12 to 36 mils (about 305 to 914 micrometers), in the range of from 14 to 36 mils (about 356 to 914 micrometers), and in still further embodiments, in the range of from 16 to 36 mils (about 406 to 914 micrometers). After drying and curing, the dry coating thickness can be in the range of from 2 to 20 mils (about 51 to 510 micrometers). Still further embodiments can comprise a dry coating thickness in the range of from 4 to 20 mils (about 101 to 510 micrometers), in the range of from 6 to 20 mils (about 152 to 510 micrometers) in yet another example, and in the range of from 7 to 20 mils (about 178 to 510 micrometers) in further another example.

EXAMPLES

Unless otherwise specified, all ingredients are available from the Aldrich Chemical Company, Milwaukee, Wis.

The following ingredients were used in the examples;

DESMODUR® H polyisocyanate available from Bayer Material Science, Pittsburgh, Pa.

CERENOL® H-1400, polytrimethylene ether diol, PT101® tint, 9T00-A activator are available from DuPont, Wilmington, Del.

JONCRYL® 918 acrylic resin is available from the BASF Corporation, Florham Park, N.J.

Preparation of Sag Control Agent 1

1.7 parts by weight (pbw) of benzyl amine was added to a mixture of 61.19 pbw of CERENOL® H-1400, 35.17 pbw of t-butyl acetate and 0.6 pbw of acetone. The mixture was stirred for 10 minutes. 1.34 pbw of DESMODUR® H polyisocyanate was added as a shot to the mixture. The solids content of the mixture was 64.23%, the weight percentage of renewable content was 61.19% and the VOC was 339 grams/liter (about 2.83 lbs/gallon). The mixture was used as is.

Preparation of Sag Control Agent 2

1.7 pbw of benzyl amine was added to a mixture of 86.36 pbw of CERENOL® H-1400, 10 pbw of t-butyl acetate and 0.6 pbw of acetone. The mixture was stirred for 10 minutes. 1.34 pbw of hexamethylene diamine was added as a shot. The solids content of the mixture was 89.4%, the weight percentage of renewable content was 86.36% and the VOC was 111 grams/liter (about 0.84 lbs/gallon). The mixture was used as is.

Preparation of Comparative Sag Control Agent A 1.7 pbw of benzyl amine was added to a mixture of 96.36 pbw of JONCRYL® 918 (63.5% in t-butyl acetate) and 0.6 pbw of acetone. The mixture was stirred for 10 minutes. 1.34 pbw of DESMODUR® H polyisocyanate was added as a shot to the mixture. The solids content of the mixture was 64.23%, the weight percentage of renewable content was 0% and the VOC was 339 grams/liter (about 2.83 lbs/gallon). The mixture was used as is.

Preparation of Coating Composition 1

A mixture of 40.45 pbw of PT101® tint and 40.45 pbw of Sag Control Agent 1 was mixed with 19.1 pbw of 9T00-A activator and stirred until homogeneous.

Preparation of Coating Composition 2

A mixture of 40.45 pbw of PT101® tint and 40.45 pbw of Sag Control Agent 2 was mixed with 19.1 pbw of 9T00-A activator and stirred until homogeneous.

Preparation of Comparative Coating Composition A

A mixture of 40.45 pbw of PT101® tint and 40.45 pbw of comparative Sag Control Agent A was mixed with 19.1 pbw of 9T00-A activator and stirred until homogeneous.

Layers of Coating composition 1 and Comparative Coating Composition A were applied to (vertical) individual steel panels in increasing film thicknesses until sags developed in the applied layer of coating composition. The thickest layer of coating that did not sag is reported. The results of the testing are shown in Table 1.

TABLE 1

|  | Coating Composition 1 | Coating Composition 2 | Comparative Coating Composition A |
|---|---|---|---|
| Sag | 18 mils (about 457 µm) | 22 mils (about 559 µm) | 12 mils (about 305 µm) |
| Solids (weight percent) | 74.94 | 85.13 | 74.94 |
| Renewable Content (%) | 24.75 | 34.93 | 0 |
| VOC* (lbs/gal) | 2.48 (297 g/l) | 1.45 (174 g/l) | 2.48 (297 g/l) |

*The VOC measurement is calculated less any exempt solvents that may be present.

Comparing Coating Composition 1 to Comparative Coating Composition A, the results show that for the same solids percentage and same volatile organic solvent content, coating compositions made with a sag control composition containing a polyurea sag control agent and polytrimethylene ether diol has better sag resistance than when using a polyurea sag control agent and an acrylic resin. Coating Composition 2 shows that the disclosed sag control composition can produce lower volatile organic content coating compositions with higher renewable content that have enhanced sag resistance.

What is claimed is:

1. A composition consisting of:
   A) polytrimethylene ether diol; and
   B) a polyurea sag control agent consisting essentially of the reaction product of an amine and a polyisocyanate, wherein the amine is essentially free from fluorinated amines.

2. A composition consisting of:
   A) polytrimethylene ether diol;
   B) a polyurea sag control agent consisting essentially of the reaction product of an amine and a polyisocyanate, wherein the amine is essentially free from fluorinated amines; and
   C) one or more organic solvents.

3. The composition of claim 1 wherein the polytrimethylene ether diol is derived from 1,3-propanediol that is obtained via the fermentation of a renewable resource.

4. The composition of claim 1 wherein the number average molecular weight of the polytrimethylene ether diol is in the range of from 250 to 10,000.

5. The composition of claim 1 wherein the polytrimethylene ether diol is derived from in the range of from 50 percent by weight to 100 percent by weight of 1,3-propane diol monomers and in the range of from 0 percent by weight to 50 percent by weight of other diols.

6. The composition of claim 5 wherein the other diols are selected from the group consisting of ethane diol, hexane diol, 2-methyl-1,3-propanediol, 2,2-dimethyl-1,3-propanediol and a combination thereof.

* * * * *